United States Patent
Shi et al.

(10) Patent No.: US 9,941,954 B2
(45) Date of Patent: Apr. 10, 2018

(54) SYSTEM AND METHOD FOR RADIO LINK SHARING

(71) Applicant: Futurewei Technologies, Inc., Plano, TX (US)

(72) Inventors: Ping Shi, San Diego, CA (US); Wee Kian Toh, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 396 days.

(21) Appl. No.: 14/577,438

(22) Filed: Dec. 19, 2014

(65) Prior Publication Data
US 2016/0182145 A1    Jun. 23, 2016

(51) Int. Cl.
| | |
|---|---|
| *H04W 88/04* | (2009.01) |
| *H04W 76/02* | (2009.01) |
| *H04B 7/26* | (2006.01) |
| *H04W 60/00* | (2009.01) |
| *H04L 12/939* | (2013.01) |
| *H04W 36/16* | (2009.01) |
| *H04W 36/00* | (2009.01) |
| *H04M 3/54* | (2006.01) |

(Continued)

(52) U.S. Cl.
CPC ......... *H04B 7/2606* (2013.01); *H04L 49/555* (2013.01); *H04W 36/00* (2013.01); *H04W 36/16* (2013.01); *H04W 60/00* (2013.01); *H04W 76/023* (2013.01); *H04L 65/1073* (2013.01); *H04M 3/54* (2013.01); *H04W 40/02* (2013.01); *H04W 88/04* (2013.01)

(58) Field of Classification Search
CPC ... H04W 12/06; H04W 84/047; H04W 24/02; H04W 88/04; H04W 76/02; H04W 92/02; H04W 4/008; H04W 60/00; H04W 8/06; H04W 12/08; H04W 88/182; H04W 88/16; H04W 8/005; H04W 40/02; H04L 63/0853; H04L 65/1073; H04L 63/0281; H04M 3/54

USPC .................... 455/7, 11.1, 13.1, 418, 419
See application file for complete search history.

(56) References Cited

U.S. PATENT DOCUMENTS

| | | | |
|---|---|---|---|
| 7,239,874 B2 * | 7/2007 | Reddy ...................... | H04W 4/02 455/419 |
| 2002/0115455 A1 * | 8/2002 | Umstetter ............ | H04B 7/2606 455/462 |

(Continued)

FOREIGN PATENT DOCUMENTS

| | | |
|---|---|---|
| CN | 102469410 A | 5/2012 |
| CN | 102811497 A | 12/2012 |
| CN | 103262632 A | 8/2013 |

OTHER PUBLICATIONS

"Google Voice," Wikipedia, http://en.wikipedia.org/wiki/Google_voice, last updated Dec. 13, 2014, 12 pgs.

*Primary Examiner* — Olumide T Ajibade Akonai
(74) *Attorney, Agent, or Firm* — Slater Matsil, LLP

(57) ABSTRACT

In one embodiment, a method includes receiving, by a first user equipment (UE) from a second UE, identity information and transmitting, by the first UE to a communications controller, the identity information. The method also includes receiving, by the first UE from the communications controller, a first packet after transmitting the identity information and transmitting, by the first UE to the second UE, the first packet in accordance with the identity information.

23 Claims, 4 Drawing Sheets

(51) Int. Cl.
   *H04L 29/06*      (2006.01)
   *H04W 40/02*     (2009.01)

(56) References Cited

U.S. PATENT DOCUMENTS

| | | | |
|---|---|---|---|
| 2004/0063451 A1* | 4/2004 | Bonta | H04W 88/04 455/519 |
| 2004/0142684 A1* | 7/2004 | Ratert | H04W 8/205 455/420 |
| 2004/0203749 A1* | 10/2004 | Iyer | H04W 8/12 455/432.1 |
| 2008/0081611 A1* | 4/2008 | Hoyt | H04W 8/205 455/425 |
| 2009/0088070 A1* | 4/2009 | Aaron | H04W 72/085 455/7 |
| 2010/0167743 A1* | 7/2010 | Palanki | H04B 7/155 455/436 |
| 2011/0096726 A1* | 4/2011 | Schlack | H04W 72/0453 370/328 |
| 2012/0115542 A1* | 5/2012 | Griffin | H04W 8/205 455/552.1 |
| 2013/0095797 A1* | 4/2013 | Paz | H04L 29/12905 455/411 |
| 2013/0176934 A1 | 7/2013 | Malladi et al. | |
| 2014/0057558 A1* | 2/2014 | Cooper | H04W 12/06 455/41.1 |
| 2014/0134986 A1* | 5/2014 | Yasumoto | H04W 4/003 455/414.1 |
| 2014/0213244 A1* | 7/2014 | Oh | H04W 4/22 455/419 |
| 2015/0349874 A1 | 12/2015 | Bhargava et al. | |

\* cited by examiner

SYSTEM AND METHOD FOR RADIO LINK SHARING

TECHNICAL FIELD

The present invention relates to a system and method for wireless communications, and, in particular, to a system and method for radio link sharing.

BACKGROUND

A single person may have access to more than one user equipment (UE), such as wearable devices, tablets, smartphones, mobile wireless routers, and other devices. These UEs have their own identity and may be connected to a wireless wide area network (WWAN) and a local network, such as a wireless local area network (WLAN) or personal area network (PAN), or through WiFi. Each UE may not have the same access to WWAN. For example, some UEs may be in a disadvantaged position with a poor radio link, for example from a blocked signal or poor radio frequency (RF) front end, less supported band, or worse radio access technology. Some UEs may be in a better location, may be supported by a wider bandwidth, have better access technology, or less of a constraint on power consumption.

Also, some UEs may have multiple subscriber identity module (SIM) card slots, which support multiple phone calls simultaneously. For example, in dual SIM dual active (DSDA) or dual SIM dual standby (DSDS) enables one UE to register a network with multiple identifiers, or multiple SIMs.

SUMMARY

An embodiment method includes receiving, by a first user equipment (UE) from a second UE, identity information and transmitting, by the first UE to a communications controller, the identity information. The method also includes receiving, by the first UE from the communications controller, a first packet after transmitting the identity information and transmitting, by the first UE to the second UE, the first packet in accordance with the identity information.

An embodiment method includes transmitting, by a first user equipment (UE) to a second UE, identity information and receiving, by the first UE from the second UE, a first message indicating that the first UE has been added to a first network after transmitting the identity information. The method also includes transmitting, by the first UE to the second UE after receiving the first message, a first packet in accordance with the identity information, where the first packet is destined for the first network.

An embodiment first user equipment (UE) includes a processor and a non-transitory computer readable storage medium storing programming for execution by the processor. The programming includes instructions to receive, from a second UE, identity information and transmit, to a communications controller, the identity information. The programming also includes instructions to receive, from the communications controller, a first packet after transmitting the identity information and transmit, to the second UE, the first packet in accordance with the identity information.

An embodiment first user equipment (UE) includes a processor and a non-transitory computer readable storage medium storing programming for execution by the processor. The programming including instructions to transmit, to a second UE, identity information and receive, from the second UE, a first message indicating that the first UE has been added to a first network after transmitting the identity information. The programming also includes instructions to transmit, to the second UE after receiving the first message, a first packet in accordance with the identity information, where the first packet is destined for the first network.

An embodiment method includes receiving, by a first user equipment (UE) from a second UE, an international mobile subscriber identity (IMSI) of a subscriber identity module (SIM) card of the second UE and transmitting, by the first UE to a communications controller, the IMSI of the SIM card of the second UE. The method also includes receiving, by the first UE from the communications controller, a first packet using a SIM card of the first UE, after transmitting the IMSI of the SIM card of the second UE and transmitting, by the first UE to the second UE, the first packet in accordance with the IMSI of the SIM card of the second UE.

An embodiment method includes transmitting, by a first user equipment to a second UE, an international mobile subscriber identity (IMSI) of a subscriber identity module (SIM) card of the first UE and receiving, by the first UE from the second UE, a message indicating that the first UE has been added to a first network after transmitting the IMSI of the SIM card of the first UE. The method also includes receiving, by the first UE from the second UE, after receiving the message, a packet, in accordance with the IMSI of the SIM card of the first UE, where the packet is from the first network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless other-

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment method involves sharing radio links between user equipments (UEs) through an internet protocol (IP) network. One UE, a requester UE, finds a better situated UE which supports multiple subscriber identity modules (SIMs) to act as a donor UE to relay the data and voice packets between the network and the requesting UE. The requester UE's tunneling identity information is tunneled through the IP network to the donor UE. Then, the requester UE communicates with the network through the donor UE.

Figure 1:
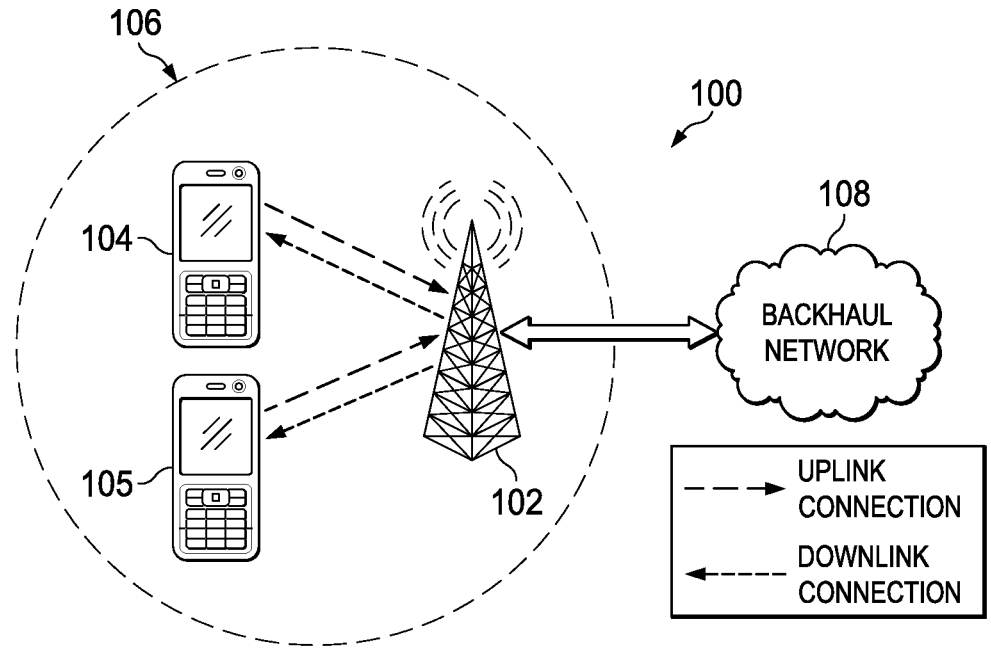
FIG. 1 illustrates a diagram of a wireless network for communicating data.

FIG. 1 illustrates network 100 for communicating data. Network 100 includes communications controller 102 having a coverage area 106, a plurality of UEs, including UE 104 and UE 105, and backhaul network 108. Two UEs are depicted, but many more may be present. Communications controller 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc.

Figure 2:
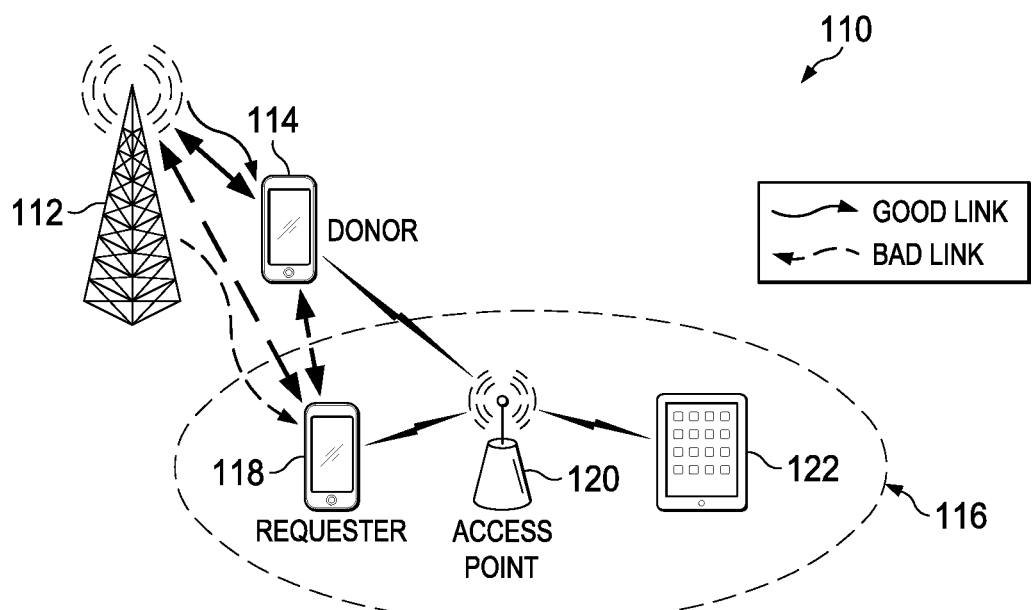
FIG. 2 illustrates an embodiment system for radio link sharing.

FIG. 2 illustrates system 110 for remotely sharing a radio link. UE 118, the requester UE, UE 122, and access point 120 are in area 116. Initially UE 118 communicates with communications controller 112. However, the link between UE 118 and communications controller 112 becomes a bad link. UE 118 loses network coverage, and enters an out-of-service state.

Then, UE queries other UEs for capability and link status (signal quality) to search for another UE to act as a donor UE. The delay from relaying may be considered in determining whether an appropriate quality of service (QoS) may be achieved. The level of SIM support is also considered in selecting a donor UE. UE 118 may use WiFi, Bluetooth, local wireless IP on top of WLAN, a personal area network (PAN), a local area network (LAN) through an access point to a wired IP network, a mixed IP network with wireless and wired elements, or another auxiliary network. UE 118 may send a request for a donor UE to access point 120, which broadcasts this request. UE 122 and UE 114 receive this request. UE 122 is not a suitable donor UE, and responds with its unavailability or with its characteristics, or it ignores the request. On the other hand, UE 114 is available to relay information from UE 118. UE 114 supports multiple SIMS, for example dual SIM dual active (DSDA), dual SIM dual standby (DSDS), triple SIM triple active (TSTA), triple SIM triple standby (TSTS) capable, or a higher SIM level, and has a good link with communications controller 112. UE 114 may use one local SIM and one remote virtual SIM may be used. In one example, UE 118 and UE 114 have a relationship. For example, they are owned by the same individual, or by family members, friends, colleagues, or an employer. The donor UE may request a PIN to authenticate the requester UE, or use another method, such as hardware identification (ID), IMSI, phone number, etc. to control the access. UE 114 responds with its acceptance, either directly or with its characteristics, to access point 120, which forwards it to UE 118.

Next, UE 118 transmits identity information, for example the international mobile subscriber identity (IMSI), along with a list of services that the UE has access to, from the SIM or other subscriber identity modules, such as universal SIM (USIM), a removable user identity module (R-UIM), or universal integrated circuit card (UICC), to UE 114. UE 114 uses the identity information from UE 118 to register UE 118 to the second network through itself. SIM is an integrated circuit which stores the IMSI and the related information used to identify and authenticate subscribers. A SIM circuit is embedded in a removable plastic card, or SIM card, which may be transferred between different mobile devices. A SIM card contains a unique serial number or integrated circuit card identifier (ICCID), an IMSI, security authentication and ciphering information, temporary information related to the local network, a list of the services the user has access to and two passwords, a personal identification number (PIN) for and a personal unblocking code (PUK) for unlocking the PIN. SIM cards store network specific information used to authenticate and identify subscribers in a network, including the ICCID, IMSI, the authentication key ($K_i$), local area identity (LAI), and an operator specific emergency number. The IMSI is used to connect mobile phone calls. The IMSI includes a mobile country code (MCC), a mobile network code (MNC), and mobile subscriber identification number (MSIN). Also, the authentication key is a 128 bit value used to authenticate SIMs on a mobile network. A SIM has a unique authentication key assigned during personalization. The authentication key is also stored in a database or authentication center on the carrier's network. A SIM card has a function run global system for mobile communications (GSM) algorithm which allows the phone to pass data to the SIM card to be signed with the authentication key. UE 118 transmits the IMSI retrieved from its SIM card to UE 114, which transmits this to the network via communications controller 112. The network searches its database for the incoming IMSI and associated authentication key. Next, the operator generates a random number (RAND), which is a nonce, and signs it with the authentication key associated with the IMSI. Also, signed response 1 (SRES_1) is computed by the network. The network transmits the RAND to UE 114 via communications controller 112, and UE 114 forwards the RAND to UE 118. The SIM card of UE 118 signs the RAND with its authentication key $K_i$, producing signed response 2 (SRES_2), which it transmits to UE 114, and UE 114 forwards SRES_2 to the network via communications controller 112. The network compares SRES_1 and SRES_2. Upon receiving the RAND, UE 118 also creates an encryption key $K_c$. When the two signed responses match, the SIM is authenticated, and UE 118 is granted access to the network via UE 114. On the other hand, when the two numbers do not match, access is denied.

After UE 118 has been added to the network, UE 118 communicates with the network through UE 114 and communications controller 112 using the encryption key $K_c$. The donor UE may use one local SIM and one remote virtual SIM. UE 118 may have a mobile phone call with the voice packets routed through UE 114 and communications controller 112. Buffering may be used to smooth voice jitter. In another example, UE 118 transmits and receives data to communications controller 112 via UE 114. Mobile originating (MO) and mobile terminating (MT) calls may be relayed through the donor UE to the requester UE.

When the signal quality of UE 118 improves, the link through UE 114 may be disconnected and a direct link is added. UE 118 may ask UE 114 to de-register UE 118 from the network. UE 118 may signal to the network to de-register itself via UE 114, and notify UE 114 upon the completion of de-registration. Then, UE 118 registers itself to the new network, and communicates with the network without UE 114.

Figure 3:
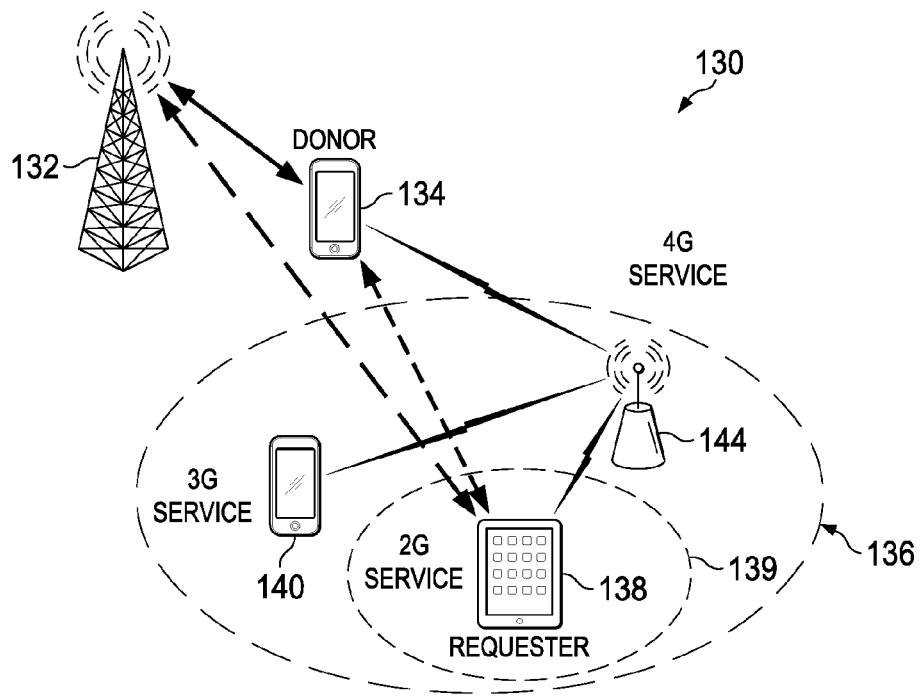
FIG. 3 illustrates another embodiment system for radio link sharing.

FIG. 3 illustrates system 130, another system which may be used for UE radio link sharing. UE 138 is in a coverage area with an available data rate lower than its desired data rate. For example, UE 138 may be in second generation of mobile telecommunications technology (2G) service area 139 and desire third generation of mobile telecommunications technology (3G) or fourth generation of mobile telecommunications technology (4G) service. In another example, UE 140 is 3G service area 136, but desires 4G service. In an additional example, the requester UE is in a 4G service area and wants fifth generation of mobile telecommunications technology (5G) service. UE 138 queries other UEs through an auxiliary network connection to find a donor UE.

Then, UE 138 queries other UEs for capability or link status to find a donor UE. The donor UE should also support multiple SIMs. The delay in tunneling through the donor UE is also considered. UE 138 may use WiFi, Bluetooth, local wireless IP on top of WLAN, a PAN, a LAN, an auxiliary wireless IP network, through an access point to a wired IP network, a mixed IP network with wireless and wired elements, or another network. To search for a donor UE, UE 138 transmits a request for a donor UE to access point 144, which broadcasts this request. UE 140 and UE 134 receive the request. UE 140 has 3G service, which may not be sufficient to warrant link sharing. UE 140 may respond with its 3G status or its unavailability, or it may ignore the request. On the other hand, UE 134 has 4G service and is available to serve as a donor UE. UE 134 has multiple SIM capability, such as DSDA, DSDS, TSTA, TSTS, or a higher level SIM capability, and has a good link with communications controller 132. UE 138 and UE 134 may have a relationship, such as being are owned by the same individual, or by family members, friends, by a common employer, colleagues, or another relationship. Donor UE responds with its acceptance to access point 144, who forwards it to UE 138.

Then, UE 138 de-registers from its current 2G network. UE 138 transmits a message to the network which UE 138 is currently using, through access point 144 requesting to be de-registered from the network. The network de-registers UE 138, and transmits an acknowledgment message to UE 138 via access point 144.

Next, UE 138 transmits identity information, such as the IMSI, along with a list of services that the UE has access to, from the SIM or another identity module, to UE 134, which uses the identity information from UE 138 to register UE 138 to the network. UE 138 transmits the IMSI retrieved from its SIM card to UE 134, which transmits the IMSI to the network via communications controller 132. The network searches its database for the incoming IMSI and associated authentication key. Next, the network generates a RAND, which is a nonce, and signs it with the authentication key associated with the IMSI. Also, SRES_1 is computed by the network. The network then transmits the RAND to UE 134 via communications controller 132, and UE 134 forwards the RAND to UE 138. The SIM card of UE 138 signs the RAND with its authentication key, producing SRES_2, which it transmits to UE 134. Next, UE 134 forwards SRES_2 to the network via communications controller 132, and the network compares SRES_1 and SRES_2. Upon receiving the RAND, UE 138 also creates an encryption key $K_c$. When the two numbers match, the SIM is authenticated, and UE 138 is granted access to the operator network via UE 134. When the two numbers do not match, access is denied.

Finally, UE 138 communicates with the network through UE 134 and communications controller 132 using the encryption key $K_c$. UE 138 may have a mobile phone call with the voice packets, data packets, and/or network access stratum (NAS) signaling from MO and MT calls are routed through UE 134 and communications controller 132 using the auxiliary IP network. Buffering may be used to smooth voice jitter for voice packets.

When UE 138 enters a better service area, for example an area with 3G, 4G, 5G, or a higher level coverage, the link through UE 134 ends. UE 138 transmits a message to UE 134 to de-register UE 138 from the network. For example, UE 134 transmits a message to the network via communications controller 132, the network de-registers UE 138, and responds with an acknowledgment message. UE 138 may signal the network and de-register itself via UE 134, and notify UE 134 upon the completion of de-registration. Then, UE 138 registers itself to the new network, and communicates with this network without use of UE 134.

Figure 4:
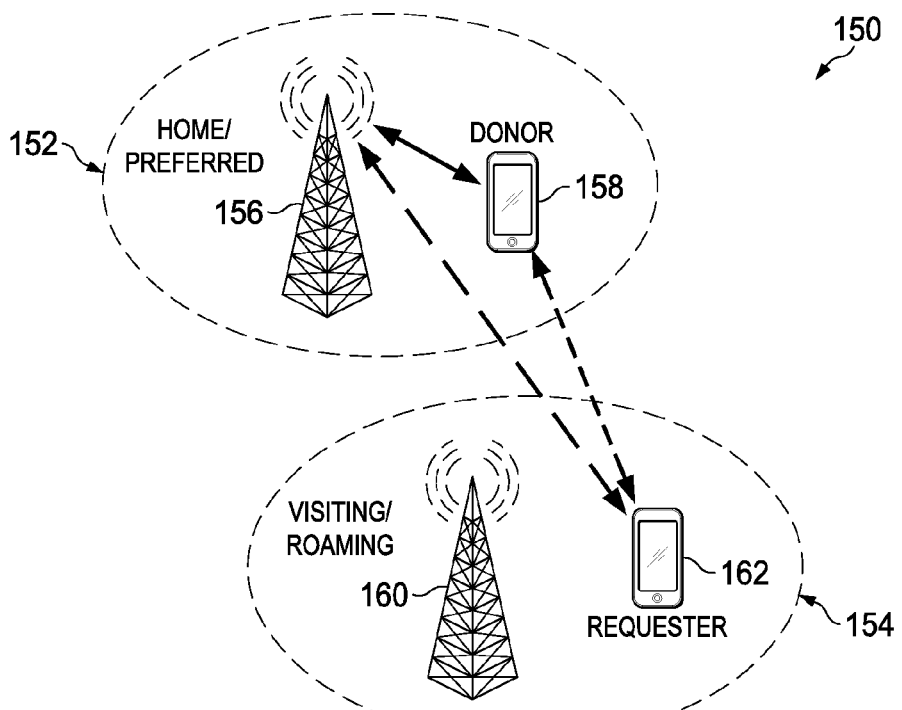
FIG. 4 illustrates an additional embodiment system for radio link sharing.

FIG. 4 illustrates system 150, an additional system, for UE radio link sharing, which may be used to avoid roaming charges and facilitate authentication in various situations, for example when accessing a bank. Also, the requestor UE may access a wireless wide area network (WWAN) network remotely when radio access technology (RAT) is not available locally. UE 162 is in area 154, with access to communications controller 160. UE 162 either has no service or is roaming in area 154. However, UE 162 has access to an auxiliary network, such as wireless or wired IP access.

UE 162 connects to UE 158 in area 152, which may be a home or preferred area for UE 162, via a wireless or wired IP network. The requestor and donor UEs may be in different geographic areas. In one example, UE 162 is in another country, or in an area without cellular service but with another form of IP service. UE 158 may have a relationship with UE 162. For example, UE 158 is a device with the same owner as UE 162, where UE 158 is at a favored location, such as home, work, or the home of a family member or friend. In another example, UE 158 is owned by a family member, friend, or colleague of the user, and is with the family member or friend at a favorable location. Donor UE may request a PIN to authenticate the requestor UE, or use another method, such as hardware ID, IMSI, phone number, etc. to control the access.

Next, UE 162 transmits identity information, such as the IMSI, along with a list of services that the UE has access to, from the SIM or another identity module, to UE 158, which uses the SIM information from UE 162 to register UE 162 to the network. UE 162 transmits the IMSI, to UE 158, which then transmits it to the network via communications controller 156. The network searches its database for the incoming IMSI and associated authentication key. Next, the network generates a RAND, which is a nonce, and signs it with the authentication key associated with the IMSI. Also, SRES_1 is computed by the operator network, which transmits the RAND to UE 158 via communications controller 156. UE 158 then forwards the RAND to UE 162. The SIM card of UE 162 signs the RAND with its authentication key, producing SRES_2, which it transmits to UE 158. UE 158 forwards SRES_2 to the network via communications controller 156. Upon receiving the RAND, UE 162 also creates an encryption key $K_c$. The operator network compares SRES_1 and SRES_2. When the two numbers match, the SIM is authenticated, and UE 162 is granted access to the operator network via UE 158. On the other hand, when the numbers do not match, access is denied.

Finally, UE 162 communicates with the network through UE 158 and communications controller 156 using the encryption key $K_c$. UE 162 may have a mobile phone call with the voice packets, data packets, and/or NAS signaling from MO and MT calls are routed through UE 158 and communications controller 156 using the auxiliary network. Buffering may be used to smooth voice jitter.

When UE 162 enters a better service area, the link through UE 158 ends. For example, UE 162 may enter a home network area or an area with coverage. UE 162 asks UE 158 to de-register itself from the network. For example, UE 158 transmits a message to the network via communications controller 156, the network de-registers UE 162, and responds with an acknowledgment message. UE 162 may signal the network and de-register itself via UE 158, and notify UE 158 upon the completion of the de-registration. Then, UE 162 registers itself to the new network, and communicates with the network without UE 158.

Figure 5:
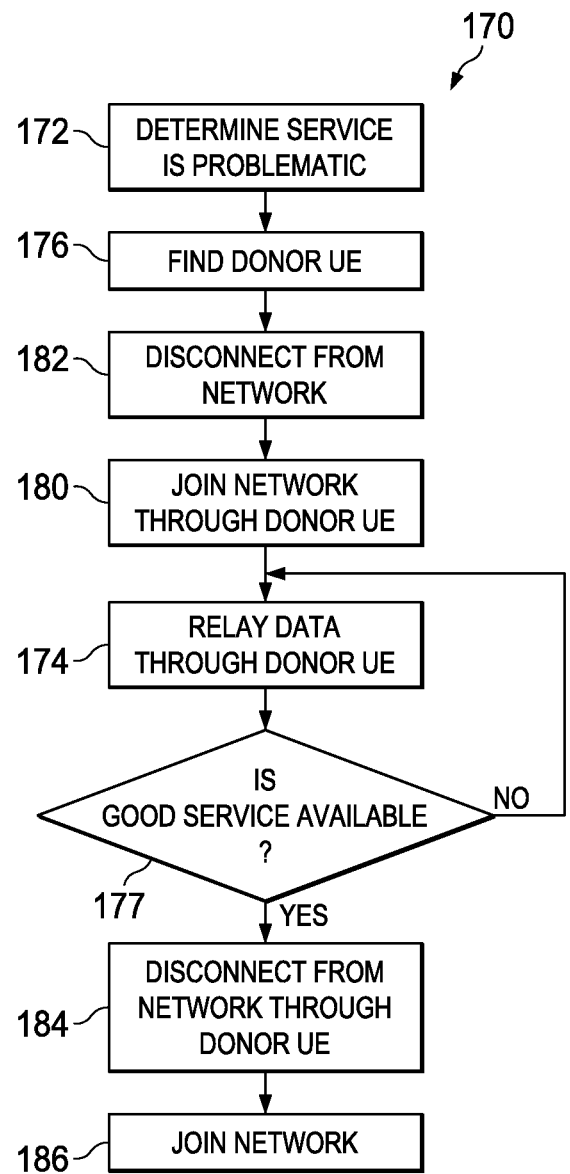
FIG. 5 illustrates an embodiment method of radio link sharing performed by a user equipment (UE)

FIG. 5 illustrates flowchart 170 for an embodiment method of remotely sharing a UE radio link performed by a requester UE. Initially, in step 172, the requester UE determines that there is a service problem, and decides to seek to share a link with a donor UE. The service problem may be a lack of service, service with a data rate lower than the desired data rate, roaming service, or another service problem, such as intermittent service.

Next, in step 176, the requester UE determines the identity of a donor UE. The requester UE may broadcast a message searching for a donor UE using an auxiliary network, such as WiFi, Bluetooth, local wireless IP on top of WLAN, a PAN, a LAN, through an access point to a wired IP network, a mixed IP network with wireless and wired elements, or another auxiliary network. Then, the requester UE may receive responses from UEs indicating whether they are able to serve as a donor UE, or with information for the requester UE to use to determine whether one of the UEs is a suitable donor UE. For example, link quality, delays, and relationships may be considered. In another example, the requester UE has a wired or wireless IP connection, and is already aware of a donor UE. The requester UE may specifically contact that UE requesting that the donor UE serve as a donor UE. The donor UE may reply with a message agreeing to serve as the donor UE or with information on the capabilities of the donor UE.

In step 182, the requester UE disconnects from its current network when it is currently connected to a network. For example, the requester UE may disconnect from a network which has poor services, for example 2G or 3G service, when the requester UE desires 4G service.

In step 180, the requester UE joins the network through the donor UE. The requester UE transmits the IMSI to the donor UE. The requester UE receives the RAND from the donor UE. The SIM card of the requester UE signs the RAND with its authentication key, producing SRES_2, which it transmits to the donor UE.

After joining the network through the donor UE, the requester UE transmits and receives packets using the donor UE in step 174. The requester UE transmits and receives packets to the donor UE, which the donor UE forwards to and from the network using an encryption key. Various types of packets, such as voice packets, data packets, and/or NAS signaling from MO and MT, may be used.

In step 177, the requester UE determines whether good service is available for a network which it directly accesses. For example, the requester UE may enter a service area where it has some service, better service, or non-roaming service. When the requester UE does not detect good service availability, it returns to step 174 and continues to relay packets through the donor UE. When the requester UE detects good service, it proceeds to step 184.

In step 184, the requester UE disconnects from the network. The requester UE transmits a message to the donor UE requesting to be disconnected from the network. In response, the requester UE receives an acknowledgment that it has been disconnected from the network. In another embodiment, the requester UE notifies the network to de-register itself, and notifies donor UE on completion on the de-registration.

Finally, in step 186, the requester UE joins the network directly, for example through a communications controller. Then, the requestor UE communicates with the network through the communications controller.

Figure 6:
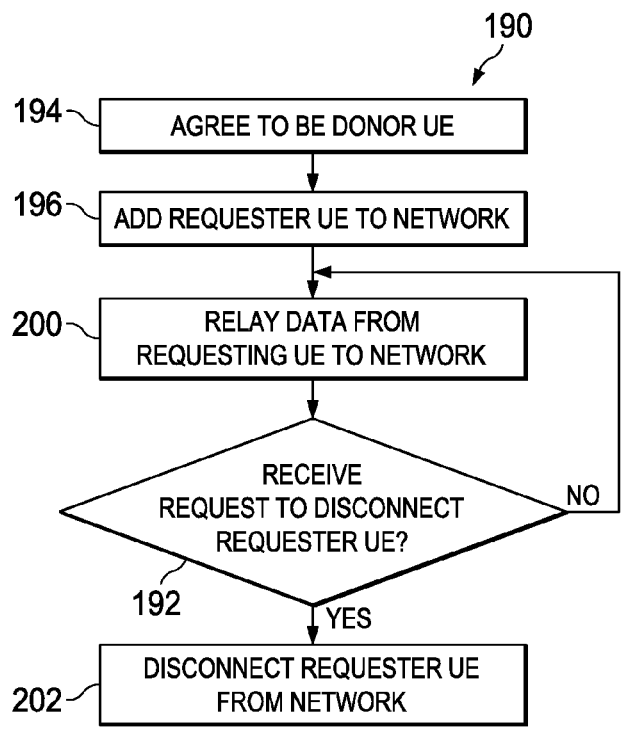
FIG. 6 illustrates another embodiment method of radio link sharing performed by a UE.

FIG. 6 illustrates flowchart 190 for a method of sharing a radio link performed by a donor UE. Initially, in step 194, the donor UE agrees to be a donor UE. The donor UE may receive a message from a requester UE asking the donor UE to serve as a donor UE. The donor UE may consider several factors in deciding whether to be a donor UE. For example, the donor UE should have multiple SIM capacity and a good connection. The donor UE may also have a pre-existing relationship with the requester UE. For example, the donor UE may be owned by the owner of the receiver UE, or by a family member, friend, or co-worker of the owner of the requester UE. The donor UE may also consider its own usage needs. The donor UE transmits a message to the requester UE indicating its willingness to serve as a UE and/or one or more factors.

Next, in step 196, the donor UE adds the requester UE to the network. The donor UE receives identity information, such as SIM or USIM information, from the requester UE, and uses the SIM information to register the requester UE to the network. Then the donor UE receives a RAND from the network, for example from the communications controller, which it forwards to the requester UE. In response, the donor UE receives SRES_2 from the requester UE, which it forwards to the network. The donor UE receives, from the network, an acknowledgment that the requester UE has been added to the network, which it forwards to the requester UE.

After the requester UE has been added to the network through the donor UE, the donor UE relays data between the requester UE and the network in step 200 using the encryption key. A mobile phone call with the voice packets, data packets, and/or NAS signaling from MO and MT calls are routed through the donor UE. The donor UE receives packets from the requester UE which it forwards to the communications controller, and receives packets from the communications controller which it forwards to the requester UE. The donor UE may be performing its own tasks at the same time.

In step 192, the donor UE determines whether it has received a request from the requester UE to remove the requester UE from the network. When there is no such request, the donor UE continues relaying packets in step 200. When the donor UE receives such a request, it proceeds to step 202. In another embodiment, the requestor UE may de-register itself from network, and send a notification to the donor UE. Upon receiving the notification, the donor UE proceeds to step 202.

In step 202, the donor UE disconnects the requester UE from the network. The donor UE may transmit a request to the communications controller requesting that the requester UE be removed from the network. When the donor UE receives an acknowledgment response from the communications controller, it forwards the acknowledgment to the requester UE. Then, the donor UE will release the resource reserved for the second SIM (virtual SIM) and continue to do its own tasks. In another embodiment, the requestor UE notifies the donor UE upon the completion of the de-registration, the donor UE releases the resources reserved for the second SIM, and continue its own tasks.

When the connection between the donor UE and requestor UE is lost, the requestor UE may start a timer. Upon the expiration of the timer, the requester UE may de-register the requester UE from the network.

When the donor UE's network and signal quality cannot support the donor UE's service, the requester UE may choose to de-register from the network and search for a new donor UE.

Figure 7:
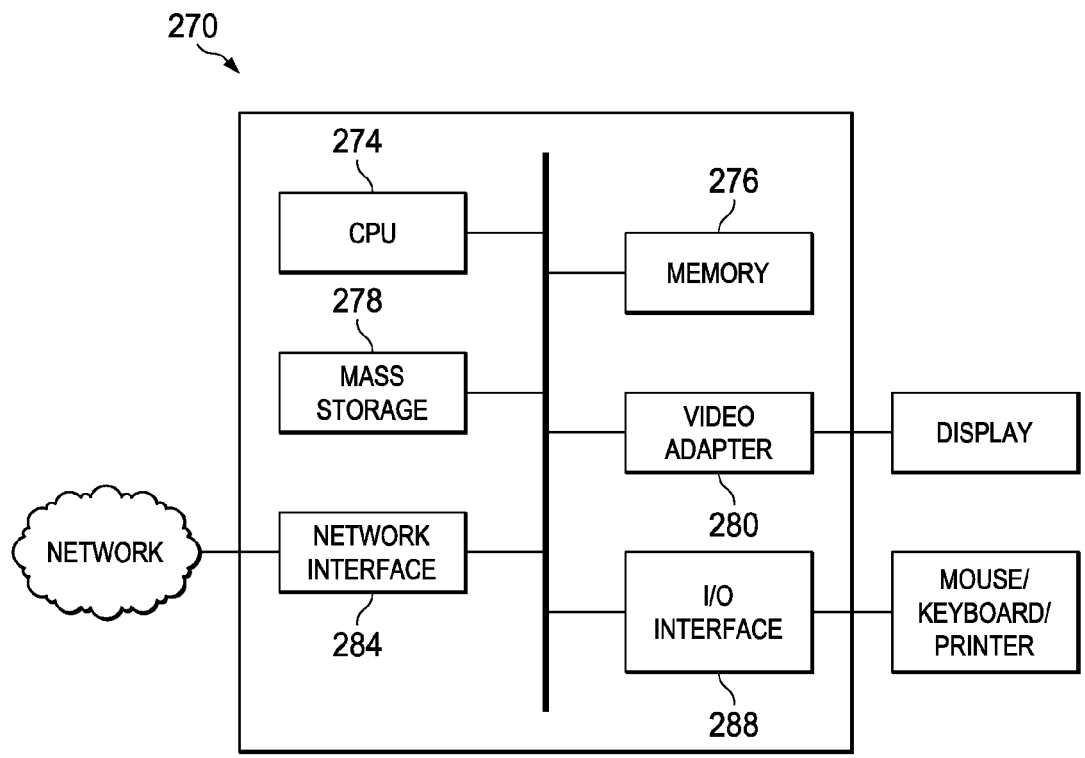
FIG. 7 illustrates a block diagram of an embodiment computer system.

FIG. 7 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adaptor 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    receiving, by a first user equipment (UE) from a second UE, identity information, wherein the identity information comprises subscriber identity module (SIM) information of the second UE;
    registering, by the first UE, the second UE to a network by transmitting the identity information to a communications controller;
    receiving, by the first UE from the communications controller, a first packet, after registering the second UE to the network; and
    transmitting, by the first UE to the second UE, the first packet in accordance with the SIM information of the second UE.

2. The method of claim 1, further comprising:
    receiving, by the first UE from the communications controller, a random number, after receiving the identity information;
    transmitting, by the first UE to the second UE, the random number;
    receiving, by the first UE from the second UE, a signed random number; and transmitting, by the first UE to the communications controller, the signed random number.

3. The method of claim 1, further comprising:
receiving, by the first UE from the second UE, after transmitting the identity information, a second packet; and
transmitting, by the first UE to the communications controller, the second packet.

4. The method of claim 1, further comprising:
receiving, by the first UE from the second UE, a first message requesting radio link sharing; and
transmitting, by the first UE to the second UE, after transmitting the first message and before receiving the identity information, a second message, wherein the second message indicates a capability of the first UE to serve as a donor UE.

5. The method of claim 1, wherein the first packet is a voice packet.

6. The method of claim 1, wherein the first packet is a data packet.

7. A method comprising:
transmitting, by a first user equipment (UE) to a second UE, identity information, wherein the identity information comprises subscriber identity module (SIM) information of the first UE;
receiving, by the first UE from the second UE, a first message indicating that the first UE has been added to a first network, after transmitting the identity information; and
transmitting, by the first UE to the second UE, after receiving the first message, a first packet in accordance with the SIM information of the first UE, wherein the first packet is destined for the first network.

8. The method of claim 7, further comprising accessing an international mobile subscriber identity (IMSI) of a subscriber identity module (SIM) card of the first UE, wherein the identity information comprises the IMSI.

9. The method of claim 8, further comprising:
receiving, by the first UE from the second UE, a random number, after transmitting the identity information;
signing the random number, to produce a signed random number; and
transmitting, by the first UE to the second UE, the signed random number.

10. The method of claim 7, further comprising receiving, by the first UE from the second UE, after receiving the first message, a second packet, wherein the second packet originates from the first network.

11. The method of claim 7, further comprising:
transmitting, by the first UE to the second UE, a second message requesting radio link sharing before transmitting the identity information;
receiving, by the first UE from the second UE, after transmitting the second message, a third message indicating a capability of the second UE to serve as a donor UE; and
determining whether the second UE will serve as the donor UE in accordance with the third message, wherein transmitting the identity information is only performed after determining that the second UE will serve as the donor UE.

12. The method of claim 7, further comprising detecting a network problem before transmitting the identity information.

13. The method of claim 12, wherein the network problem is a lack of service.

14. The method of claim 12, wherein the network problem is that the network imposes charges on the first UE.

15. The method of claim 12, wherein the network problem is that an available data rate of the network is lower than a target data rate of the first UE.

16. The method of claim 7, further comprising:
searching for a second network;
determining whether the second network provides good service to the first UE;
disconnecting from the first network, upon determining that the second network provides good service to the first UE; and
connecting to the second network after disconnecting from the first network.

17. A first user equipment (UE) comprising:
a processor; and
a non-transitory computer readable storage medium storing programming for execution by the processor, the programming including instructions to:
receive, from a second UE, identity information, wherein the identity information comprises subscriber identity module (SIM) information of the second UE,
register the second UE to a network by transmitting the identity information to a communications controller,
receive, from the communications controller, a first packet, after registering the second UE to the network, and
transmit, to the second UE, the first packet in accordance with the SIM information of the second UE.

18. A first user equipment (UE) comprising:
a processor; and
a non-transitory computer readable storage medium storing programming for execution by the processor, the programming including instructions to:
transmit, to a second UE, identity information, wherein the identity information comprises subscriber identity module (SIM) information of the first UE,
receive, from the second UE, a first message indicating that the first UE has been added to a first network, after transmitting the identity information, and
transmit, to the second UE after receiving the first message, a first packet in accordance with the SIM information of the first UE, wherein the first packet is destined for the first network.

19. The first UE of claim 18, wherein the instructions further comprise instructions to:
receive a first packet, from the first network, after receiving a message indicating that the first UE has been added to a first network, and
transmit the first packet to the second UE, wherein the first packet is destined for the first network.

20. The first UE of claim 18, wherein the first packet is a voice packet.

21. The first UE of claim 18, wherein the first packet is a data packet.

22. A method comprising:
receiving, by a first user equipment (UE) from a second UE, an international mobile subscriber identity (IMSI) of a subscriber identity module (SIM) card of the second UE;
registering, by the first UE, the second UE to a network by transmitting the IMSI of the SIM card of the second UE to a communications controller;
receiving, by the first UE from the communications controller, a packet using the SIM card of the first UE, after registering the second UE to the network; and transmitting, by the first UE to the second UE, the packet in accordance with the IMSI of the SIM card of the second UE.

23. A method comprising:

transmitting, by a first UE (user equipment) to a second UE, an international mobile subscriber identity (IMSI) of a subscriber identity module (SIM) card of the first UE;

receiving, by the first UE from the second UE, a message indicating that the first UE has been added to a network, after transmitting the IMSI of the SIM card of the first UE; and receiving, by the first UE from the second UE via the network, after receiving the message, a packet, in accordance with the IMSI of the SIM card of the first UE.

\* \* \* \* \*